United States Patent Office 3,100,682
Patented Aug. 13, 1963

3,100,682
PRODUCTION OF LOW SULFATE
URANIUM OXIDE
Andrew D. Kelmers, Warwick, N.Y., assignor to Union
Carbide Corporation, a corporation of New York
No Drawing. Filed Apr. 15, 1960, Ser. No. 22,408
2 Claims. (Cl. 23—14.5)

This invention relates to the production of oxidic uranium concentrates and specifically to the production of sulfate free oxidic uranium concentrates by solvent extraction methods.

Uranium occurs as various minerals throughout the Western States. The uranium bearing ores rarely contain uranium oxide in greater than 1.0 percent and usually contain uranium oxide in about 0.1–0.3 percent. In addition, the fissionable specie of uranium constitutes only about 0.7 percent of all the uranium present in the ore. Since large amounts of ore must be treated to acquire the final uranium in any significant amount, it is imperative that extensive concentration steps be carried out in the vicinity of the mines to produce uranium concentrates thereby reducing the burden of shipping excess gangue with the values.

The metallurgical art surrounding uranium relies heavily on the solvent-extraction process of concentrating uranium oxide from the mother ores. This process has proved exceedingly satisfactory in separating uranium oxide values from the parent ore but in some respects and in some adaptations of solvent extraction a problem of detrimental sulfate contamination has arisen. This leads to a final concentrate with sulfate contamination as high as 12–17 percent by weight of the final uranium oxide concentrate. Penalties are levied by the Atomic Energy Commission in commercial transactions based upon the sulphate level in the products.

Throughout this specification, solutions containing the uranium values will be termed liquors. Solutions substantially free of uranium values will be termed simply barren solutions. In addition, the term oxidic uranium will be construed and used herein to indicate all derivaties of uranium oxide including uranium hydroxide, hydrated uranium, hydroxides of uranium and uranyl derivatives of uranium oxide produced in a process similar to that hereinafter described.

A typical example of prior art practice in the recovery of uranium is illustrated in the following process:

Uranium mother ore is leached in a sulfuric acid solution to extract oxidic uranium by solubilizing them to form an acidic-sulphate leach liquor. A solvent extractant is caused to contact the pregnant leach liquor and the oxidic uranium values are thereby separated from the pregnant leach liquor by passing into the solvent-extractant phase. The uranium-loaded solvent-extractant phase is separated from the now barren leach solution and stripped of the uranium values by causing the loaded-extractant phase to contact a basic sodium-carbonate solution. The carbonate component in the basic sodium carbonate stripping solution causes the effluent uranium values to stay in solution as sodium uranyltricarbonate. The stripping solution is thereby rendered the carrier of the uranium values as a sodium-carbonate secondary liquor. The recovery of uranium values from the secondary liquor is a batchwise process and is facilitated by adjusting the pH of the secondary liquor by adding $H_2SO_4$ and eliminating the carbonate component of the uranyltricarbonate by heating. The pH is adjusted to approximately 2 by the addition of sulfuric acid. Precipitation is initiated and completed by addition of gaseous ammonia until the pH of the secondary liquor is approximately 7 to 8. The uranium values precipitate from the basic solution which has been purged of its carbonate component.

The prior art teaches the necessity of prolonging the length of the precipitation step and the thickening and filtration steps to enable a greater contact time between the uranium oxide precipitate and the secondary liquor which contains the uranium values in solution. After the long digestion period the precipitate is thickened, filtered, washed in an attempt to decrease the sulfate content and calcined to a final oxidic uranium product. The final product is commonly referred to as "yellow cake."

A period of several hours or even days will elapse in the prior art batch process of thickening and filtering before the precipitated uranium values are separated from the sulphate-containing secondary liquor. The yellow cake produced by the aforementioned prior art method is characterized by a high residual sulphate content normally running in the range of from 12–17 weight percent sulphate. Residual sulphate in the yellow cake is considered deleterious in later beneficiation and purification steps as evidenced by the present penalties which have been established by the A.E.C. on yellow cake concentrates containing greater than 10 percent of the total weight of uranium oxide component as a sulphate component.

The object of the present invention is to put forth a process for the production of oxidic uranium wherein the extent of deleterious residual sulphate contamination is controlled and a filterable oxidic uranium precipitate is obtained.

It is another object of the present process to produce oxidic uranium which does not contain greater than 10 weight percent sulphate in the final product.

It is further an object of the present process to produce oxidic uranium having less than 1 weight percent residual sulphate contamination.

Other objects will be apparent from the remaining disclosure.

The process which accomplishes the above-mentioned objects is conducted in substantially the same manner as shown in the aforementioned prior art process. The improvement over the prior art process consists of decreasing the time of contact between the secondary liquor and the oxidic uranium precipitate which is formed by the addition of gaseous ammonia to the secondary liquor. This is directly in opposition to prior teachings which advocated the necessity of an increased digestion time.

Though the problem of sulphate contamination has existed for quite some time, no satisfactory solution has been found. The relationship of contact time between the oxidic uranium precipitate and the sulphate-containing secondary liquor and the effect of the extent of contact time on the extent of sulphate contamination was never established.

The inventor has found that as the secondary solution is neutralized with ammonia, the bulk of the uranium values precipitate as hydrated oxides of uranium similar in composition and structure to the mineral becquerelite. This is the desired sulphate free precipitate. If this precipitate is allowed to stay in contact with the sulphate containing secondary liquor in either the precipitation or the filtration steps for an extended length of time, the becquerelite transforms into a basic uranyl sulphate which is analogous to the mineral zippeite. After this transformation, the sulphate cannot be washed from the zippeite mineral and as a consequence the final uranium oxide product contains high sulphate.

The present invention employs a decrease in the contact-time while still maintaining the production of a filterable product. From the physical set up of the process of oxidic-uranium extraction by the aforementioned prior art method there are three steps during which the concept of the present invention can be applied. They are during precipitation, thickening and/or filtration. Since it is conceivable that all can, and in many instances are, conducted simultaneously in a single batch operation or in a continuous operation, the inventor will not limit the application of their improvement to any particular step of the process of precipitation and separation of the uranium oxide product. Rather the inventor teaches a substantial decrease in the contact time between the uranium oxide precipitate and the sulfate secondary liquor. Such a decrease can be effected by modifying the rate of precipitation, thickening and/or filtering time singly or in combination in such a manner as to decrease the total contact time to less than approximately 1 hour.

Tests to ascertain the relationship between contact time and sulphate analysis in the final product have been carried out as follows:

A slow precipitation of 4.75 hours was conducted on a standard secondary liquor by the introduction of gaseous ammonia followed by rapid thickening and filtration. The resulting yellow cake contained 9.7 weight percent sulphate. Rapid precipitation was then conducted on a standard secondary liquor followed by slow thickening and filtering. The resulting yellow cake analyzed 14 to 17 weight percent sulfate. The tests show that the combined time for precipitation and filtration, including thickening, controls the sulfate contamination in the product.

The following examples will further illustrate the present invention:

A large batch of acidified secondary liquor at pH 2.9 was precipitated by recycling the solution and adding ammonia at the recycle pump until a final pH of 7.2 was reached. Two hours and ten minutes time was expended to complete the ammonia addition. The uranium started precipitating at a pH of about 5. The actual time in which solid precipitate was in contact with mother liquor was less than two hours. Samples were collected during and immediately following precipitation. They were filtered and washed immediately. Samples of oxidic uranium taken during the precipitation showed sulfate contents of 0.64 to 1.8 weight percent. Three samples were taken from the tank immediately after the precipitation was completed (less than 2 hours' contact time) and these samples showed that the sulfate ranged from 0.70 to 1.0 weight percent. The remaining batch of precipitate was then processed by prior art thickening and filtration procedure. The solids contained 14 to 17 weight percent sulfate after such thickening and filtering thereby demonstrating the necessity of rapidy filtering the solids.

In order to obtain a better estimation of the maximum time limit for the precipitation and filtration steps, additional work was carried out. A sample of secondary sulfate strip solution was acidified with sulfuric acid and boiled to destroy the carbonate. This solution contained, by analysis, 71.8 g./l. of $U_3O_8$ and 110 g./l. of sulfate. Portions of it were precipitated by adding concentrated ammonium hydroxide over the periods of time indicated in Table I. The solids were promptly filtered and washed with water.

| Precipitation time (minutes): | Sulphate analyses, percent |
|---|---|
| 8¼ | 0.24 |
| 15 | 0.64 |
| 30 | 0.59 |
| 60 | 1.0 |
| 120 | 7.4 |
| 360 | 12.3 |

The results of the test as shown in Table I indicate that up to 60 minutes could be allowed for the precipitation and filtration steps while still maintaining 1 weight percent or less of sulfate contamination.

It is readily seen from the above description and examples that the contact time between the oxidic uranium precipitate and the secondary sulfate liquor is all controlling of the final sulphate analysis in the final product. It is not deemed necessary to recite the numerous routine mechanical variations which a person skilled in the pertinent art would readily employ to adapt the present invention to the many specific situations in which this invention is amenable.

What is claimed is:

1. In the process of producing oxides of uranium from uranium ore comprising leaching uranium values from ore to form a pregnant leach liquor, contacting said leach liquor with a solvent extractant to transfer said uranium values from said pregnant leach liquor to said solvent extractant thereby forming a loaded solvent extractant, removing said loaded solvent extractant from contact with said leach liquor, contacting said loaded solvent extractant with a sodium carbonate stripping solution thereby causing the uranium values to transfer from said loaded solvent extractant to said sodium carbonate stripping solution to form a sodium carbonate secondary liquor, adding sulfuric acid to said sodium carbonate secondary liquor until said sodium carbonate secondary liquor is converted to an acidic secondary sulphate liquor having a pH of about 2, heating said acidic secondary sulphate liquor to a temperature sufficient to decompose the carbonate component and maintaining said temperature until said carbonate component is substantially decomposed, and adding an ammonia compound to said acidic secondary sulphate liquor until said acidic secondary sulphate liquor has been converted to a basic secondary sulphate liquor having a pH of about 7 to 8 and thereby causing precipitation of the uranium values from the basic secondary sulphate liquor as an oxidic uranium precipitate, the improvement comprising removing said precipitate from said basic secondary sulphate liquor before said precipitate has been in contact with said basic secondary sulphate liquor for a period of greater than about 1 hour; and washing said precipitate to form a final oxide of uranium containing less than about 1.0 weight percent sulphate.

2. In the process of producing oxides of uranium from uranium ore comprising leaching uranium values from ore to form pregnant leach liquor, contacting said leach liquor with a solvent extractant to transfer said uranium values from said pregnant leach liquor to said solvent extractant thereby forming a loaded solvent extractant, removing said loaded solvent extractant from contact with said leach liquor, contacting said loaded solvent extractant with a sodium carbonate stripping solution thereby causing the uranium values to transfer from said loaded solvent extractant to said sodium carbonate stripping solution to form a sodium carbonate secondary liquor, adding sulfuric acid to said sodium carbonate secondary liquor until said sodium carbonate secondary liquor is converted to an acidic secondary sulphate liquor having a pH of about 2, heating said acidic secondary sulphate liquor to a temperature sufficient to decompose the carbonate component and maintaining said temperature until said carbonate component is substantially decomposed, and adding an ammonia compound to said acidic secondary sulphate liquor until said acidic secondary sulphate liquor has been converted to a basic secondary sulphate liquor having a pH of about 7 to 8 and thereby causing precipitation of the uranium values from the basic secondary sulphate liquor as an oxidic uranium precipitate, the movement comprising removing said precipitate from said basic secondary sulphate liquor before said precipitate has been in contact with said basic secondary sulphate liquor for a period of greater than about .15 hour; and washing said precipitate to form a final oxide of uranium containing less than about .25 weight percent sulphate.

References Cited in the file of this patent

UNITED STATES PATENTS

| | | |
|---|---|---|
| 2,176,610 | Stamberg | Oct. 17, 1939 |
| 2,536,347 | Brimm | Jan. 2, 1951 |
| 2,654,653 | Nye et al. | Oct. 6, 1953 |
| 2,761,757 | Kamen et al. | Sept. 4, 1956 |
| 2,762,685 | Brundin | Sept. 11, 1956 |
| 2,771,338 | Spiegler | Nov. 20, 1956 |
| 2,779,657 | Ballard | Jan. 29, 1957 |
| 2,800,387 | Kimball et al. | July 23, 1957 |
| 2,847,277 | King et al. | Aug. 12, 1958 |
| 2,877,250 | Brown | Mar. 10, 1959 |

UNITED STATES PATENT OFFICE
CERTIFICATE OF CORRECTION

Patent No. 3,100,682                         August 13, 1963

Andrew D. Kelmers

It is hereby certified that error appears in the above numbered patent requiring correction and that the said Letters Patent should read as corrected below.

Column 5, line 8, for "movement" read -- improvement --.

Signed and sealed this 14th day of April 1964.

(SEAL)
Attest:

ERNEST W. SWIDER
Attesting Officer

EDWARD J. BRENNER
Commissioner of Patents